US005367861A

United States Patent [19]

Murakawa et al.

[11] Patent Number: 5,367,861

[45] Date of Patent: Nov. 29, 1994

[54] RIDING LAWN MOWER

[75] Inventors: Masatake Murakawa, Sakai; Mikio Yuki, Kawachinagano; Ryozo Imanishi, Kishiwada; Masatsugu Tone, Hashimoto; Akira Minoura, Sakai, all of Japan

[73] Assignee: Kubota Corporation, Osaka, Japan

[21] Appl. No.: 978,761

[22] Filed: Nov. 19, 1992

[30] Foreign Application Priority Data

| | | | |
|---|---|---|---|
| Dec. 17, 1991 | [JP] | Japan | 3-333099 |
| Dec. 17, 1991 | [JP] | Japan | 3-333100 |
| Mar. 6, 1992 | [JP] | Japan | 4-049443 |
| Mar. 6, 1992 | [JP] | Japan | 4-049447 |

[51] Int. Cl.[5] .......... A01D 34/64

[52] U.S. Cl. .......... 56/11.8; 56/15.8; 56/DIG. 22

[58] Field of Search .......... 56/15.8, 11.7, 11.8, 56/DIG. 6, DIG. 22

[56] References Cited

U.S. PATENT DOCUMENTS

| | | | |
|---|---|---|---|
| 3,169,358 | 2/1965 | Ertsgaard et al. | 56/DIG. 22 X |
| 4,679,382 | 7/1987 | Saruhashi et al. | 56/DIG. 22 X |
| 4,733,522 | 3/1988 | Johansson | 56/DIG. 22 X |
| 4,882,897 | 11/1989 | Oshima et al. | 56/11.3 |
| 4,977,733 | 12/1990 | Samejima et al. | 56/14.7 |
| 5,016,722 | 5/1991 | Morita et al. | 180/89.14 |

*Primary Examiner*—Terry Lee Melius
*Attorney, Agent, or Firm*—Gifford, Groh, Sprinkle, Patmore and Anderson

[57] ABSTRACT

A small riding lawn mower having a grass cutting unit suspended from a body frame between a front axle and a rear axle, an engine supported by a body frame in a position forwardly of the rear axle with respect to a longitudinal direction of the body frame, a hydrostatic transmission disposed rearwardly of the rear axle, and a driver's seat disposed forwardly of the engine. The body frame includes profile members disposed at opposite sides and extending longitudinally of the mower, and a cross plate interconnecting the profile members. A belt transmission mechanism connecting the hydrostatic transmission to an engine output shaft is surrounded by a plate frame structure formed below the body frame. The plate frame structure defines a further independent chamber for accommodating a muffler of the engine. This chamber has peripheral walls shaped to guide cooling air from the engine to the muffler and laterally outwardly of the mower.

6 Claims, 8 Drawing Sheets 10
11
36
47
46
1
16
50a
12
3
4
23
22
14
13
100
7
25a
20
6
5
9
8
17
18a
2
25
25b 25(25c)
28
29
27a
30
27
100
26
19
4(4b)
21

1
2
3
4
5
5a
6
7
7a
7A
8
9
10
11
12
13
14
15a
15b
17
18
18a
19
20
21
22
23
24
25
27
28

1
2
3
4
5
5a
6
7
7A
7a
8
9
10
11
12
13
14
15a
15b
17
18a
20
22
23
25
25b
27a
27b
27b

RIDING LAWN MOWER

BACKGROUND OF THE INVENTION

1. Field of the Invention

The present invention relates to small riding lawn mowers.

2. Description of the Related Art

Conventionally, a grass cutting operation is carried out for a relatively small area of land by using a lawn mower of the type controlled by a walking operator as disclosed in U.S. Pat. No. 4,882,897. The walking operator type lawn mower, because of its small size, has the advantage of being easy to handle; it may be used in cutting grass in narrow spaces among trees and may be stored in a shed or the like with ease. However, the operator must always walk behind the machine during a grass cutting operation though the operation is carried out in a small area of land. Thus, the walking operator type lawn mower has a disadvantage in terms of labor. This type of mower is particularly difficult for an aged or lame person to handle. There is an increasing demand for a very small riding lawn mower today.

A conventional tiding lawn mower, as seen from FIG. 1 of U.S. Pat. No. 4,977,733, has an engine mounted on a forward position thereof, and drive is transmitted from the engine to a gearbox through a hydrostatic transmission mounted under a driver's seat. The gearbox acts also as a rear axle case, and the engine, hydrostatic transmission and gearbox are arranged virtually between front and rear wheels. This arrangement provides a stable vehicle structure which, however, has limitations for miniaturization of the lawn mower. Further, U.S. Pat. No. 5,016,722 discloses a from mower having a grass cutting unit mounted forwardly of a vehicle body. In this construction also, an engine, a hydrostatic transmission and a gearbox are arranged between front and rear wheels to make miniaturization difficult. Thus, it is necessary to change the basic structure in order to realize a small riding lawn mower that may be driven with the same touch as for controlling the conventional walking operator type lawn mower.

SUMMARY OF THE INVENTION

The object of the present invention is to provide a small riding lawn mower having control and operating performances similar to those of a walking operator type lawn mower.

The above object is fulfilled, according to the present invention, by a riding lawn mower comprising a vertical engine disposed forwardly of a rear axle with respect to a longitudinal direction of a body frame, a hydrostatic transmission disposed rearwardly of the rear axle for changing speed of engine output and outputting it to the rear axle, and a driver's seat disposed forwardly of the engine.

In the above construction, the heavy engine is disposed forwardly of the rear axle, and the hydrostatic transmission rearwardly of the rear axle. Thus, the propelling transmission line is arranged around the rear axle without impairing the balance of the mower body. This arrangement achieves a reduction in the length of the transmission line for compactness. According to this construction, the driver's seat is disposed substantially centrally among the front and rear wheels to facilitate steerability of the mower. This arrangement is particularly advantageous for a mid-mount mower having a grass cutting unit disposed between front and rear wheels. With the grass cutting unit having a cutting blade disposed under the driver, an operation may readily be carried out in a way to follow precise grass cutting lines.

Other features and advantages of the invention will be apparent from the following description of the preferred embodiment taken with reference to the accompanying drawings.

DETAILED DESCRIPTION OF THE PREFERRED EMBODIMENT

Figure 1:
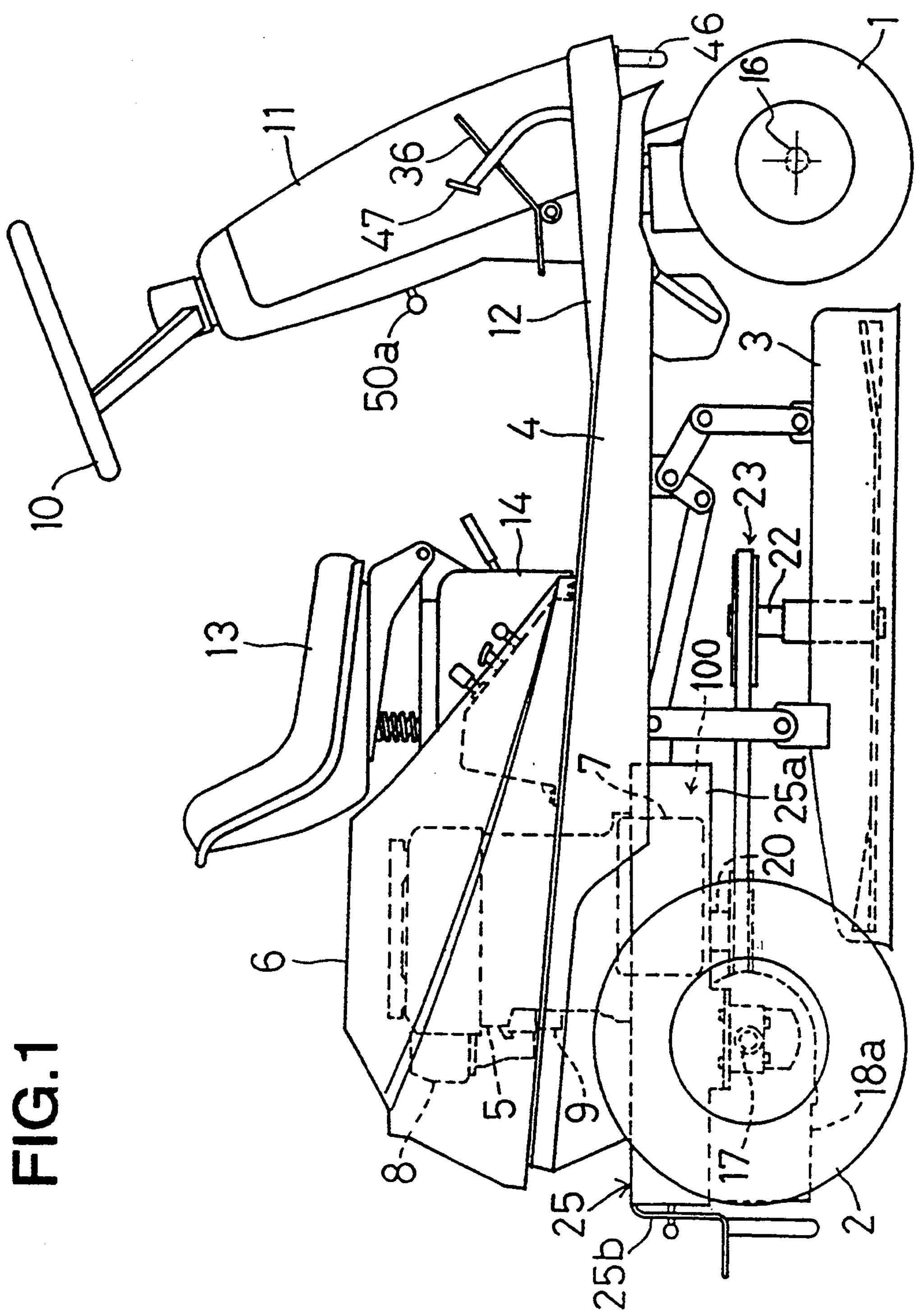
FIG. 1 is a mid-mount type small riding lawn mower according to the present invention.
Figure 2:
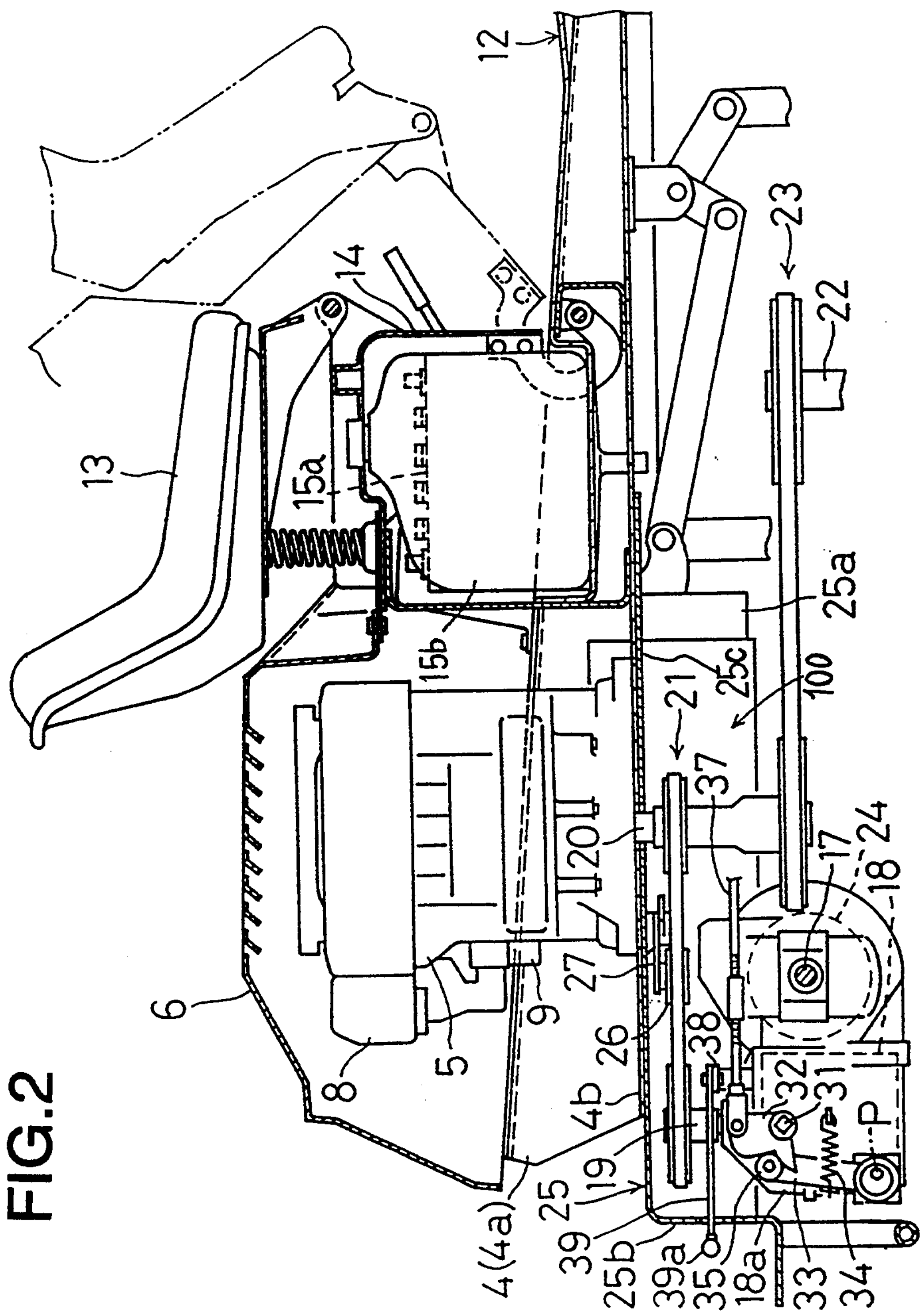
FIG. 2 is a side view, partly in section, of a rear portion of the lawn mower.

FIG. 1 is a mid-mount type small riding lawn mower according to the present invention. FIG. 2 is a side view, partly in section, of a rear portion of the lawn mower. The mower has a body frame 4 supported on a front axle 16 connected to dirigible front wheels 1 and a rear axle 17 connected to rear drive wheels 2. A grass cutting unit 3 is suspended from the body frame 4 between the front wheels 1 and rear wheels 2.

A vertical engine 5 is supported by the body frame 4 between the front wheels 1 and rear wheels 2 and immediately forwardly of the rear axle 17. Adjacent the engine 4 are an engine hood 6 covering the engine 4, a muffler 7, an air cleaner 8 and a carburetor 9. The body frame 4 is formed of fight and left channel members **4*a*, and a cross plate 4*b* interconnecting the channel members 4*a***.

A driver's section includes a front column 11 having a steering wheel 10, a step floor 12 and a driver's seat 13. The driver's seat 13 is located immediately forwardly of the engine 5. Consequently, the grass cutting unit 3 is fight under the driver's seat 13. A floor cover 14 provided also under the driver's seat 13 contains a battery **15*a* and a fuel tank 15*b***.

A propelling transmission system includes an HST (hydrostatic stepless transmission) 18 disposed rearwardly of the rear axle 17 to act as a central element thereof. The HST 18 has an input shaft 19, and a first belt interlocking mechanism 21 is provided between the input shaft 19 and an engine output shaft 20 extending downward through the cross plate **4*b*. The engine output shaft 20 is connected also to a blade shaft 22 of the grass cutting unit 3 through a second belt interlocking mechanism 23. The rear axle 17 and a differential 24 are mounted in a casing 18*a* containing the HST 18. The casing 18*a* is suspended from a sub-frame 25 secured to a lower rearward surface of the body frame 4. The sub-frame 25 has right and left side walls 25a and a rear wall 25b, which define a substantially closed space 100 in combination with the casing 18a. An upper portion of this space 100 is utilized to accommodate the first belt interlocking mechanism 21**.

Figure 3:
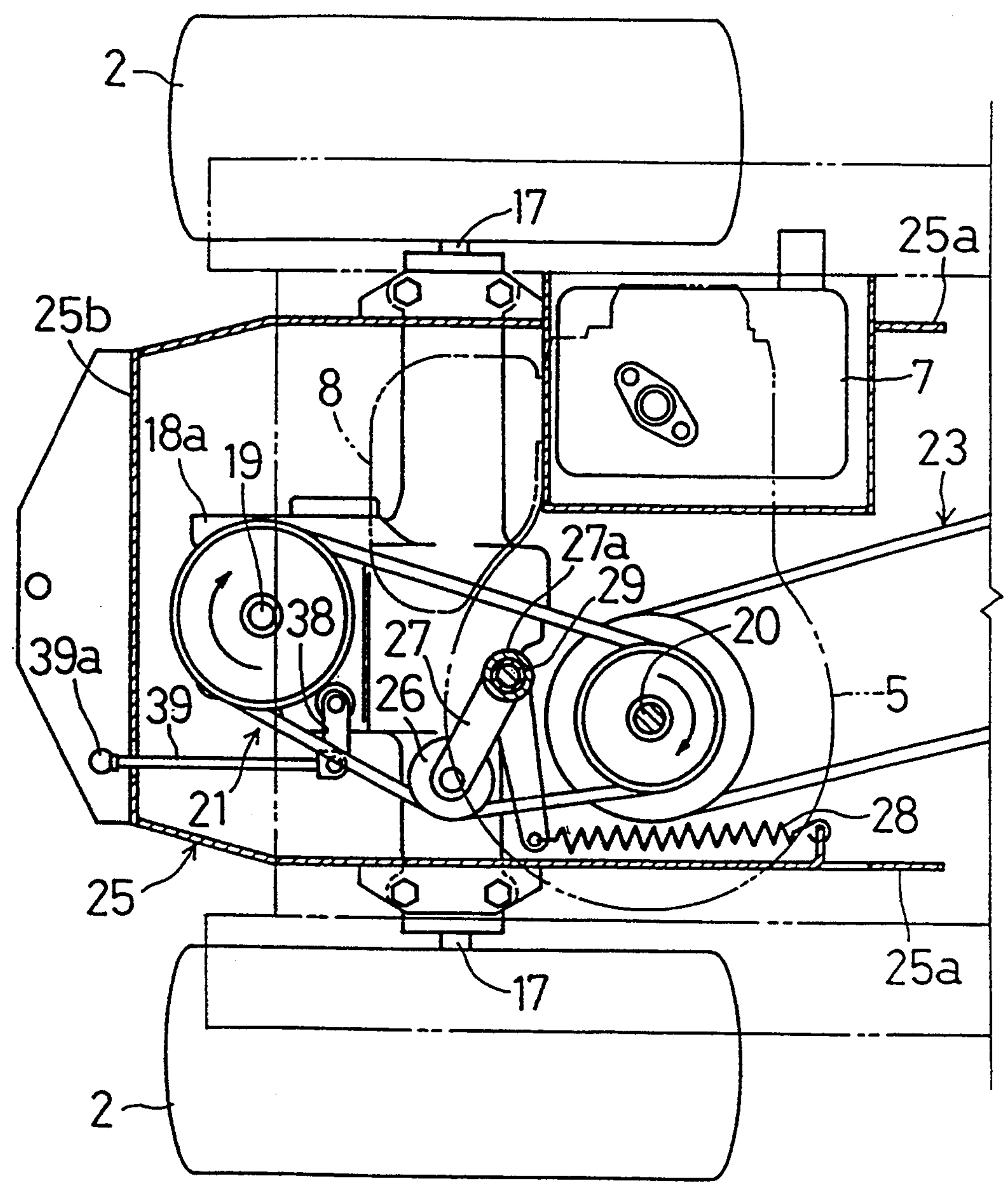
FIG. 3 is a plan view of a belt transmission mechanism for transmitting drive from an engine to a hydrostatic transmission.
Figure 4:
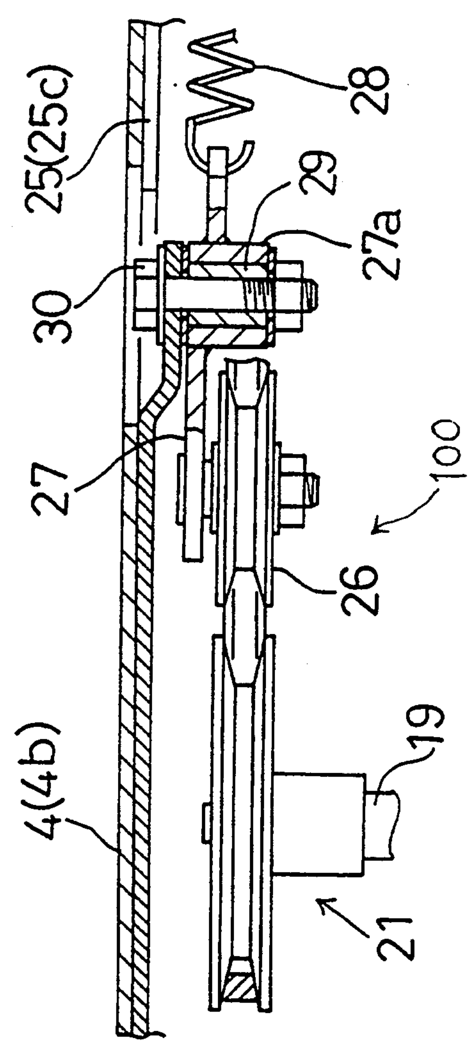
FIG. 4 is a fragmentary side view, partly in section, of a structure for supporting a tension arm of the belt transmission mechanism shown in FIG. 3.

As shown in FIG. 3, the first belt interlocking mechanism 21 is maintained in tension by a tension mechanism including a tension arm 27 having a tension roller 26 and a spring 28. The spring 28 has an end thereof hooked to one of the side walls 25a of the sub-frame 25. As shown in FIG. 4, the tension arm 27 has a boss 27a loosely fitted on a collar 29 fixed to a recessed portion of an upper wall 25c of the sub-frame 25 by a bolt and nut 30.

A control system for operating the HST 18 will be described next. As shown in FIG. 2, a neutralizing mechanism E includes a cam plate 32 fixed to a trunnion 31, a swing arm 33 pivotable about a lower end axis P, and a tension spring 34. The swing arm 33 is biased by the spring 34 so that a roller 35 mounted at a distal end of the swing arm 33 rest in a curved recess of the cam plate 32. The HST 18 is in neutral when the roller 35 lies in the recess. The cam plate 32 is interlocked to a change speed pedal 36 in the driver's section. The mower is driven forward when the change speed pedal 36 is depressed forward, and is driven backward when the pedal 36 is depressed backward.

The HST 18 includes a neutral valve (not shown) to enable the driver to push the lawn mower. As shown in FIG. 3, a control lever 38 for operating the neutral valve is connected to a control rod 39 extending through the rear wall 25b of the sub-frame 25. The control rod 39 has a knob 39a attached to a rear end thereof. Thus, the driver may operate the control rod 39 at the rear end of the mower with ease to neutralize the HST 18 for a hand-push mode.

Figure 5:
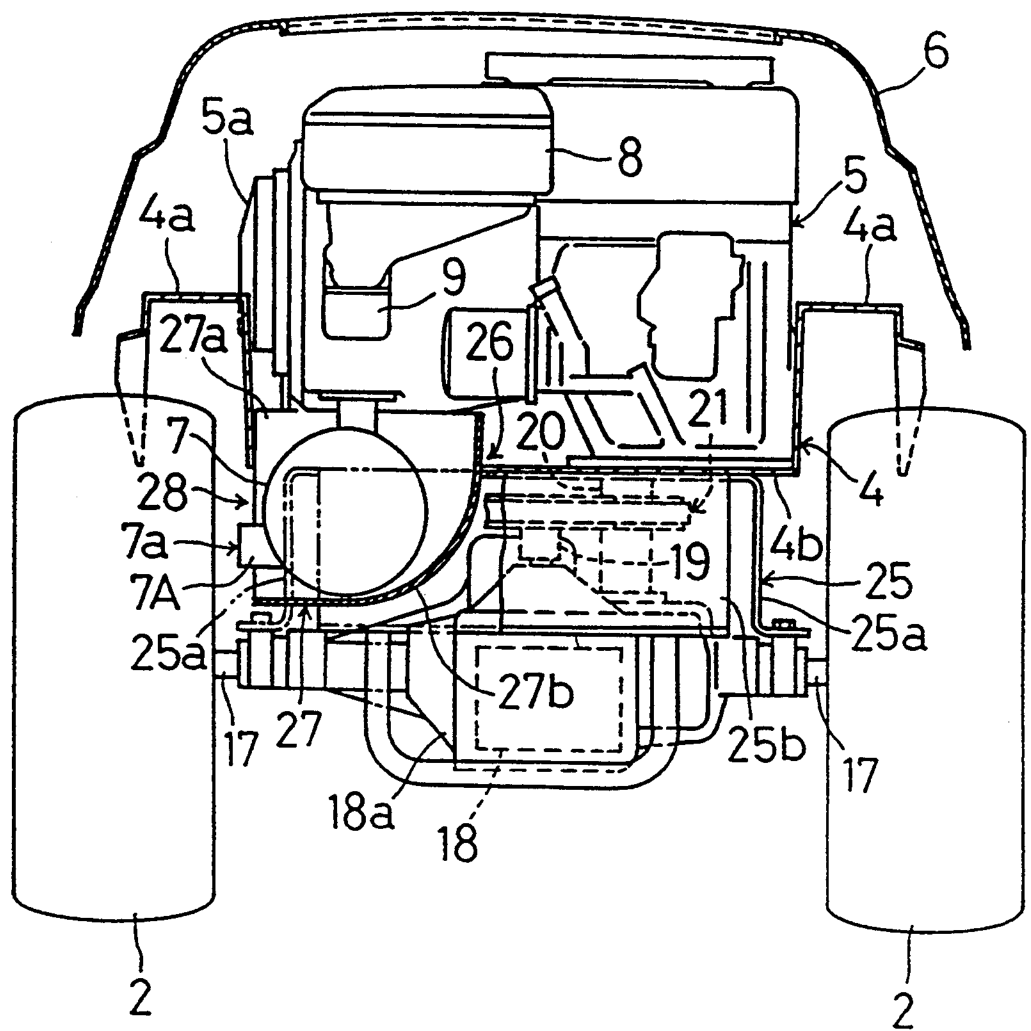
FIG. 5 is a rear view, partly in section, showing an arrangement of the engine and muffler.
Figure 6:
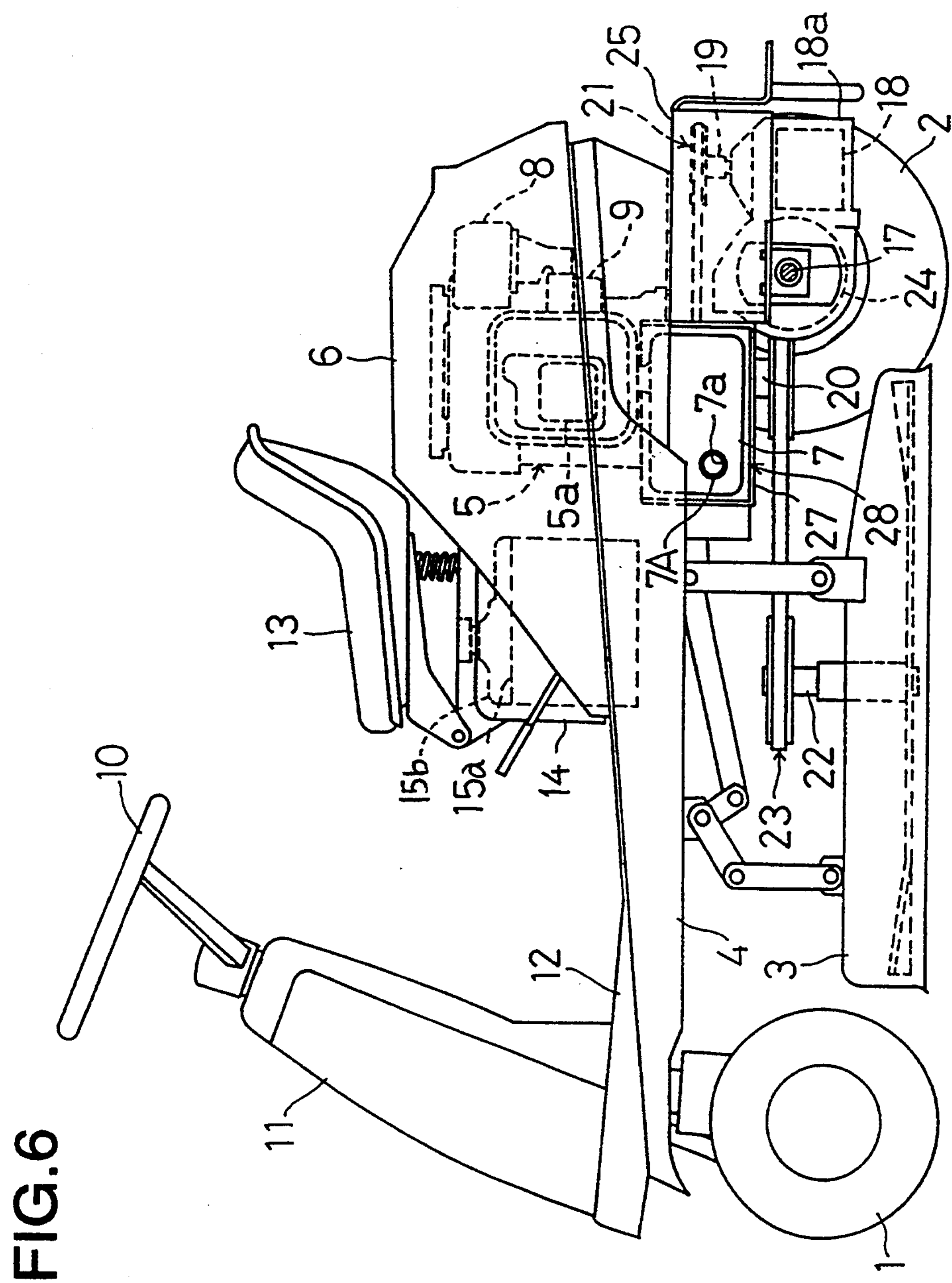
FIG. 6 is a side view showing the arrangement of the engine and muffler.
Figure 7:
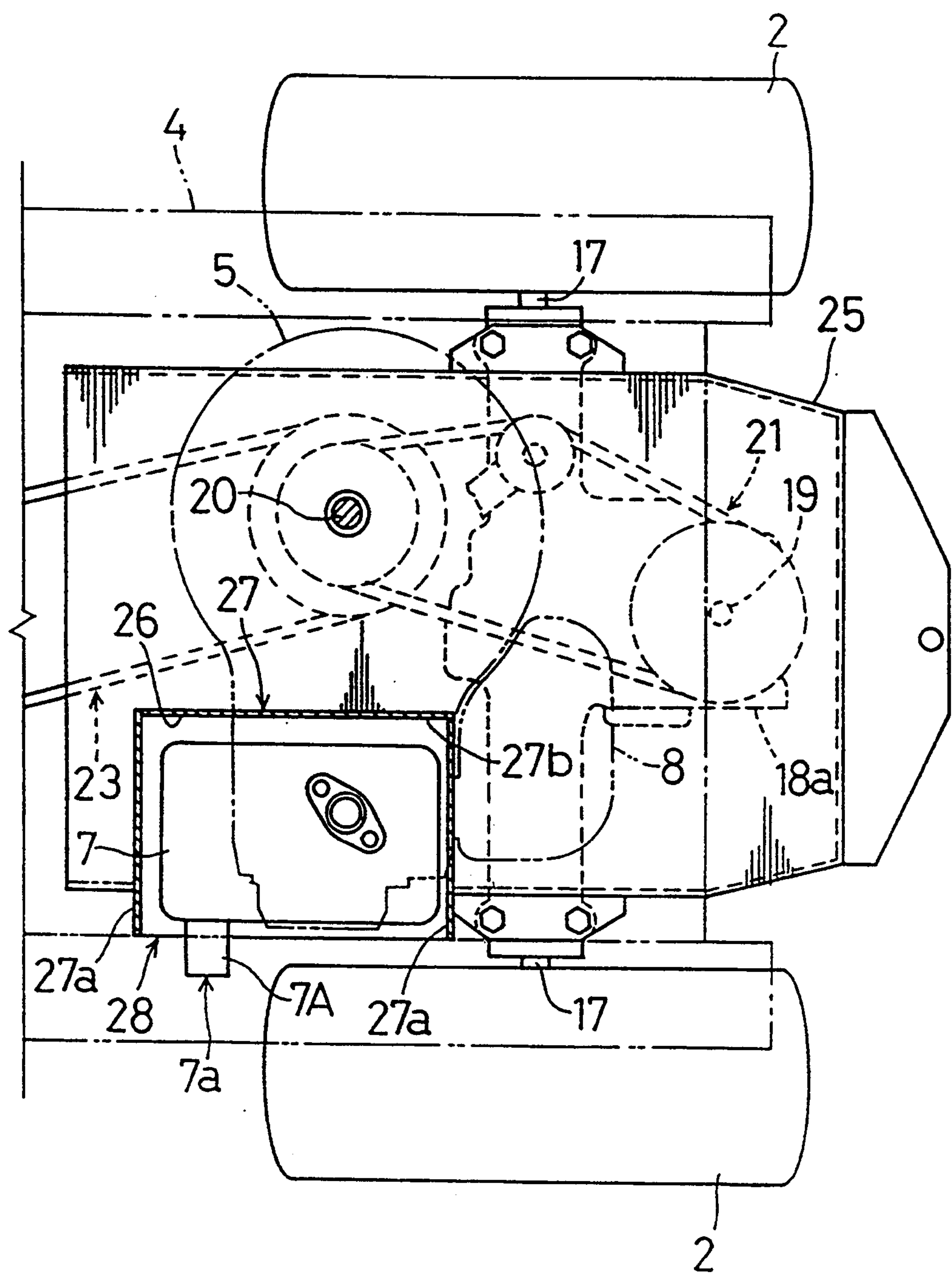
FIG. 7 is a partial plan view showing the arrangement of the engine and muffler.

FIGS. 5 through 7 are illustrations to facilitate understanding of a precise arrangement of engine accessories, particularly the muffler 7. As seen from these drawings, the engine 5, which is an air-cooled engine, is placed sideways with a cylinder head 5a disposed leftward. The muffler 7 having a cylindrical shape is disposed right under the cylinder head 5a to extend in a fore and aft direction. The muffler 7 lies in a space not interfering with the casing 18a, first belt interlocking mechanism 21 or a cutting unit accommodating space S. The cross plate 4b includes a cutout 26 through which the muffler 7 is settled with respect to the body frame 4 in a way that a large pan of the muffler 7 lies inside the sub-frame 25.

The muffler 7 is surrounded by an air guide covering 27 including front and rear walls 27a and a curved side wall 27b. Consequently, cooling air having cooled the cylinder head 5a is guided to outer peripheries of the muffler 7, and out through an exhaust opening 28 defined in the left side wall 25a of the sub-frame 25. Further, the muffler 7 has an exhaust pipe 7A projecting laterally through the exhaust opening 28. Thus, exhaust gas exiting an exhaust outlet 7a flows laterally outwardly of the mower as entrained on the cooling air.

Figure 8:
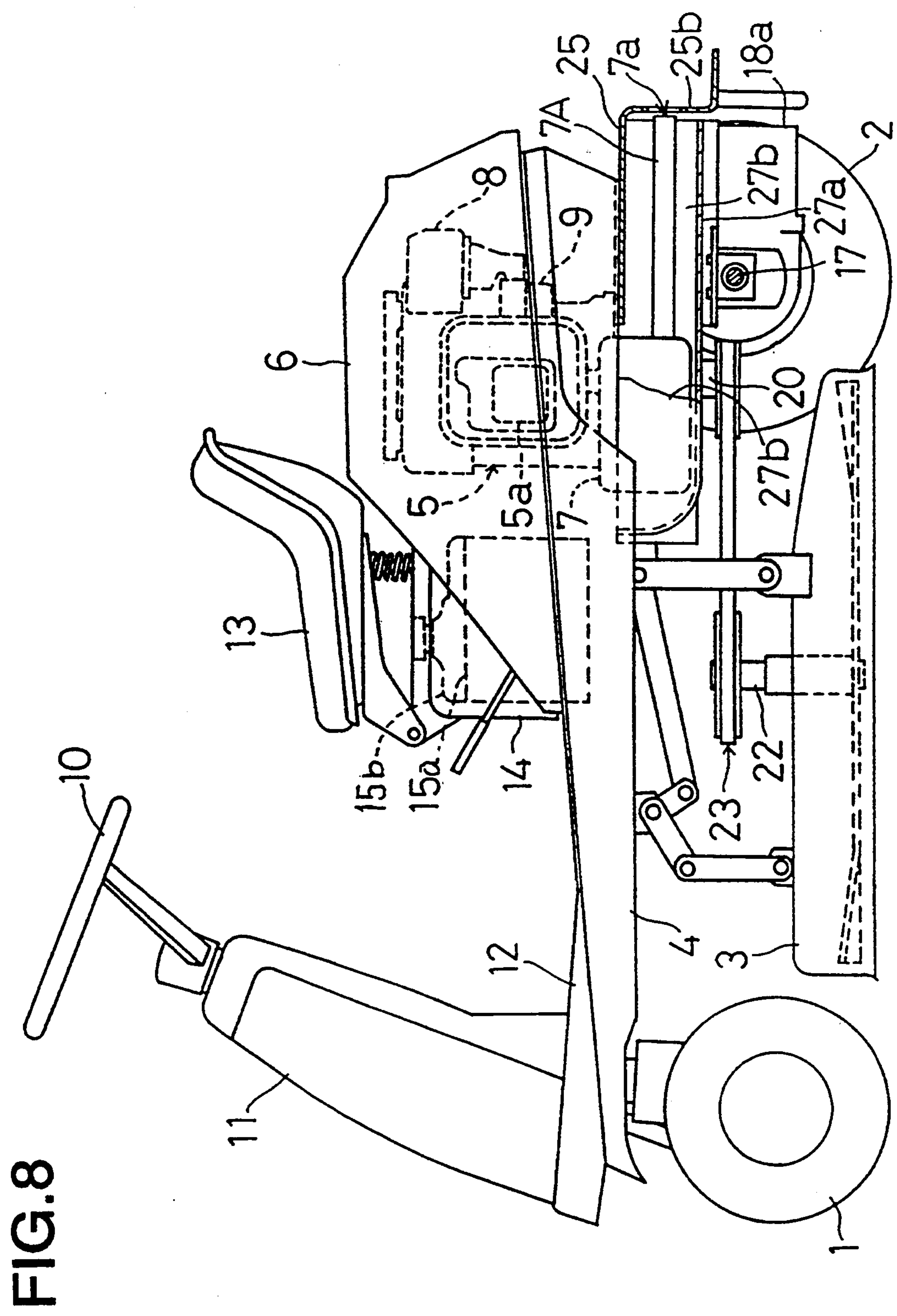
FIG. 8 is a side view showing a modified arrangement of a muffler and adjacent components.

The above muffler arrangement may be modified as shown in FIG. 8. In this example, the muffler 7 has an exhaust pipe 7A extending rearwardly from a rear surface thereof. The exhaust pipe 7A defines an exhaust outlet 7a for discharging exhaust gas rearwardly through an opening defined in the rear wall 25b of the sub-frame 25. Cooling air may be guided rearwardly by an air guide cover 27 including a front wall 27a and right and left side walls 27b.

What is claimed is:

1. A riding lawn mower comprising:
a set of front wheels and a set of rear wheels;
a front axle connected to said front wheels and a rear axle connected to said rear wheels;
a body frame supported by said front and rear axles;
a grass cutting unit suspended from said body frame and including a rotary blade;
an engine having a vertical output shaft extending downwardly, said engine being supported by said body frame in a position forwardly of said rear axle with respect to a longitudinal direction of said body frame;
a hydrostatic transmission disposed rearwardly of said rear axle with respect to the longitudinal direction of said body frame, said hydrostatic transmission outputting drive in varied speeds to said rear axle;
transmission means for connecting said output shaft of said engine to said hydrostatic transmission; and
a driver's seat disposed forwardly of said engine; and
said body frame defining a chamber, a muffler of said engine being disposed within said chamber, said chamber having peripheral walls shaped to guide cooling air from said engine to said muffler, and means for exhausting air from said chamber.

2. A riding lawn mower as defined in claim 1, wherein said grass cutting unit is suspended in a space between said front axle and said rear axle.

3. A riding lawn mower as defined in claim 2, wherein said engine is disposed such that cylinders thereof extend transversely of the body frame.

4. A riding lawn mower as defined in claim 1, wherein said body frame includes profile members disposed at opposite sides and extending longitudinally of the mower, and a cross plate interconnecting said profile members.

5. A riding lawn mower as defined in claim 4, wherein said transmission means comprises a belt transmission mechanism, said body frame has a plate frame structure secured to a lower surface thereof to define another chamber for accommodating said belt transmission mechanism.

6. A riding lawn mower comprising:
set of front wheels and a set of rear wheels;
front axle connected to said front wheels and a rear axle connected to said rear wheels;
a body frame supported by said front and rear axles, said body frame including profile members disposed at opposite sides and extending longitudinally of the mower, and a cross plate interconnecting said profile members;
a grass cutting unit suspended from said body frame and including a rotary blade;
an engine having a vertical output shaft extending downwardly, said engine being supported by said body frame in a position forwardly of said rear axle with respect to a longitudinal direction of said body frame;
a hydrostatic transmission disposed rearwardly of said rear axle with respect to the longitudinal direction of said body frame, said hydrostatic transmission outputting drive in varied speeds to said rear axle;
transmission means for connecting said output shaft of said engine to said hydrostatic transmission, said transmission means comprises a belt transmission mechanism, said body frame has a plate frame structure secured to a lower surface thereof to define a first chamber for accommodating said belt transmission mechanism;

said plate frame structure defines a second chamber independent of said first chamber for accommodating a muffler of said engine, said second chamber having peripheral walls shaped to guide cooling air from said engine to said muffler and laterally outwardly of the mower; and a driver's seat disposed forwardly of said engine.

* * * * *

UNITED STATES PATENT AND TRADEMARK OFFICE

CERTIFICATE OF CORRECTION

PATENT NO. : 5,367,861

DATED : November 29, 1994

INVENTOR(S) : Masatake Murakawa et al

It is certified that error appears in the above-indentified patent and that said Letters Patent is hereby corrected as shown below:

Column 1, line 24, delete "tiding" and insert --riding--;

Column 1, line 34, delete "from" and insert --front--.

Column 2, line 46, delete "fight" and insert --right--;

Column 2, line 53, delete "fight" and insert --right--.

Column 3, line 48, delete "pan" and insert --part--.

Column 4, line 45,
Claim 6, line 2, before "set" insert --a--;

Column 4, line 46,
Claim 6, line 3, before "front" insert --a--.

Signed and Sealed this

Fourth Day of April, 1995

Attest:

BRUCE LEHMAN

*Attesting Officer* *Commissioner of Patents and Trademarks*